United States Patent [19]

Munster et al.

[11] 3,914,742

[45] Oct. 21, 1975

[54] APPARATUS FOR USE IN OPTICAL READING MACHINES FOR TRANSFORMING A TWO-DIMENSIONAL LINE PATTERN INTO OPTO-ELECTRONICALLY DETECTABLE IMAGES

[75] Inventors: Ebbe Münster, Horsholm; Per Ponsaing, Copenhagen, both of Denmark

[73] Assignee: Instituttet for Produktudvikling, Lyngby, Denmark

[22] Filed: June 19, 1974

[21] Appl. No.: 480,791

[30] Foreign Application Priority Data

June 25, 1973 Denmark ........................... 3510/73

[52] U.S. Cl. .................. 340/146.3 F; 340/146.3 AE; 350/162 SF

[51] Int. Cl.$^2$ .......................................... G06K 9/12

[58] Field of Search ...................... 356/71; 250/550; 350/162 SF, 190; 340/146.3 F, 146.3 P, 146.3 G, 146.3 S

[56] References Cited

UNITED STATES PATENTS

| | | | |
|---|---|---|---|
| 3,171,097 | 2/1965 | Fitzmaurice et al. | 340/146.3 G |
| 3,248,552 | 4/1966 | Bryan | 340/146.3 G |
| 3,255,436 | 6/1966 | Gamba | 340/146.3 G |
| 3,519,331 | 7/1970 | Cutrona et al. | 350/162 SF |
| 3,641,255 | 2/1972 | Macovski | 350/162 SF |
| 3,824,546 | 7/1974 | Kawasaki et al. | 340/146.3 F |
| 3,829,832 | 8/1974 | Kawasaki | 340/146.3 P |

*Primary Examiner*—Leo H. Boudreau
*Attorney, Agent, or Firm*—Sughrue, Rothwell, Mion, Zinn & Macpeak

[57] ABSTRACT

An apparatus for use in an optical reading machine for two-dimensional line patterns for the optical transformation of such a line pattern in a number of spaced channels into opto-electronically detectable images each of which is correlated with the original line pattern and extracts a certain line orientation therefrom by means of an optical filter in each channel having uni-directional power of resolution and one-dimensional redundance, said optical filters being arranged with different directions of resolution in the individual channels, the image plane of each channel being raster sub-divided into elementary areas each of which is subjected to an opto-electronical detection of the presence of line segments or tangential inclinations having a direction corresponding to the resolution of the same channel.

5 Claims, 7 Drawing Figures

APPARATUS FOR USE IN OPTICAL READING MACHINES FOR TRANSFORMING A TWO-DIMENSIONAL LINE PATTERN INTO OPTO-ELECTRONICALLY DETECTABLE IMAGES

The present invention relates to optical reading machines operating on the basis of a pattern-recognition process and, in particular, to an apparatus for use in such machines for the optical transformation of a two-dimensional line pattern into opto-electronically detectable images.

BACKGROUND OF THE INVENTION

In recent years the development in modern society-life has resulted in an ever increasing amount of written communication items. Therefore, a considerable interest has grown for the development of methods suitable for automatical machine processing of such items. In particular, this applies in fields in which a very great number of communication carriers which are relatively uniform in respect of shape and size is to be processed. To give obvious examples reference may be made to the machine processing of mail items in connection with sorting of such items according to destinations and addresses in the form of city or town names and street names as well as to the processing of relatively simple forms occurring in great numbers.

Moreover, also the development within the data processing field has strengthened the interest for developing optical reading processes on account of the considerable manual labour which is usually involved in the production of input data for a computing process in a form suitable for data processing on the basis of existing written material which may often be very voluminous.

Within the postal field it is well-known that a number of countries with a view to mechanical automated sorting of letter items have introduced so-called postal number or zip-codes as code designations for the destinations of such items. In order to be ready for mechanical sorting each individual item has to be provided with a code indication which is directly detectable by the sorting plant. In known sorting plants this encoding of the items is usually taking place in manually operated encoding apparatuses on the basis of the postal numbers or zip-codes written on the items. However, extensive efforts are made in order to develop suitable optical reading processes which can allow a direct encoding of postal items without manual operations, the purpose thereof being to avoid any manual processing in the sorting of a greater part of the total number of letter items.

In principle, an optical reading method for the above-mentioned purpose will always have to be based on a pattern recognition process in which a two-dimensional line pattern belonging to one of a given number of pattern classes is detected and transformed with a view to deciding or selecting the actual class to which the pattern belongs. In the above-mentioned fields of application the line pattern may be a digit or a letter and the number of pattern classes may thus equal the number of digits in the digit system in question, for example the decimal system, or the number of letters in the alphabet or the sum thereof. In the pattern recognition processes which are known to-day within these fields of application there is produced on the basis of an input image of the line pattern proper to be classified or one or more images correlated with said pattern and obtained by optical transformation thereof an electronic raster image in the form of a binary matrix comprising a great number of character elements for the purpose of further signal processing, said binary character elements being generated by suitable opto-electronic means on the basis of threshold evaluation of individual elementary areas of the input image or the image correlated therewith.

To give examples of opto-electronic means employed for producing said electronic raster image in optical reading machines in use to-day reference may be made to scanning-type cathode-ray tubes which are controlled to directly scan an input image in the form of a true representation of the line pattern, videcon cameras, rotating mirrors in combination with a Nipkov-disc, photo-cell matrices and integrated photo-diode devices. The use of scanning-type cathode ray tubes has for example been described in the articles "The IBM 1975 Optical Page Reader" by R. B. Hennis and M. R. Bartz in IBM Journal of Research and Development, No. 5, 1968, pages 364 to 363.

However, the optical reading machines in use to-day have shown that a relatively complicated and voluminous data processing unit is necessary in order to achieve a satisfactory power of resolution for the binary matrix generated from the input image at the reading speeds which are considered necessary for practical purposes, said reading speeds being of the order of magnitude of 10,000 characters per second. This fact makes a considerable contribution to the relatively high prices of such reading machines.

This disadvantage is due to the fact that in order to achieve a satisfactory power of resolution in these known system a relatively fine raster subdivision of the pattern image in elementary areas is necessary whereas, on the contrary, an upper limit for the fineness of this subdivision is set by considerations in respect of the volume and complexity of the data processing equipment. The result in practice is that noise is introduced to a most inconvenient degree in the opto-electronic detection process.

In order to eliminate this drawback it has been suggested to subject the input image of a line pattern to be classified to optical transformation in a number of spatially separated channels for generating a number of opto-electronically detectable images which are correlated with the line pattern and each of which extracts a particular feature of said pattern. As a result hereof the raster subdivision of these channel-individual images may be made considerably coarser and the electric signal images from the individual channels may be combined into an electronic raster image suitable for data processing.

One method of performing such an optical transformation has been disclosed, inter alia, in U.S. Pat. No. 3,255,436 to A. Gamba and in German Pat. application No. 1,449,612 published before acceptance (Offenlegungsschrift). In this method the optical transformation in each channel consist in a filtering process performed by a lens-mask assembly so that the image formed in one channel represents a particular element belonging to a line pattern in the pattern classes in question, for example a rectilinear line segment of a given orientation or a curved line segment. It is readily understandable that in this method the optical efficiency will be low since a considerable part of the light quantity available will be cut off by the mask. As a result hereof the signal-to-noise ratio in the opto-electronic detection process will be relatively low.

According to another method which has been described, inter alia, in the article "Character Recognition Methods Using Kinoforms" by D. W. Baxter, M. J. Burke and D. H. Caster in IBM Technical Disclosure Bulletin, No. 8, January 1972, pages 2,503 to 2,504 the optical transformation is performed by a holographic process involving the use of special synthetic phase-holograms in the form of so-called "Kinoform" filters. As far as the image resolution in partial elements is concerned, this method underlies the same principles as the above-mentioned lens-mask filtering process, but a considerable increase of the optical efficiency is obtained. However, this method has completely failed with respect to employment in practical systems due to the very complicated problems and enormous costs involved in the production of the necessary kinoform holograms.

SUMMARY OF THE INVENTION

The present invention has for its object to provide an apparatus particularly intended for performing the optical transformation of the input image of a line pattern in a pattern recognition process, by means of which a number of opto-electronically detectable images correlated with said pattern are generated in separated channels without the disadvantages and drawbacks of the prior methods referred to above. Thus, it is contemplated to obtain a power of resolution sufficient for practical purposes in optical reading machines with a simple and inexpensive optical equipment and a high optical efficiency.

According to the invention there is provided an apparatus for use in an optical reading system for two-dimensional line patterns for the optical transformation of such a line pattern in a number of separated channels into opto-electronically detectable images, each of which is correlated with the original line pattern and extracts a particular line orientation in said pattern, said images forming together the basis information for a subsequent data computing process for classifying said pattern into one of a given number of pattern classes, said apparatus comprising as the transformation medium in each of said channels an optical filter having unidirectional power of resolution and one-dimensional redundance, said optical filters being arranged in different ones of said channels with mutually differing directions of resolution; a common object plane for all said channels; means in said object plane for positioning said line pattern; an image plane for each of said channels; means for subdividing the image formed in each of said image planes into a raster of elementary areas; and photo-sensitive means arranged at each of said image planes for the detection of each of said elementary areas.

In this apparatus a line segment filtering process is employed in which each of the individual channels extracts rectiliniar line segments or tangent inclinations having an orientation corresponding to the direction of resolution of the channel. Only line segments having this particular orientation will be imaged with full luminous intensity whereas all other line segments having an orientation different from the direction of resolution will be blurred in the direction of resolution and will, thus, be reproduced in the image plane at a reduced luminous intensity. Thus, by performing a raster subdivision of the image formed in the image plane of each channel in a manner known per se it will be possible to make a threshold evaluation of each elementary area of the image resulting from this subdivision and thereby detect whether or not such an elementary area contains a rectilinear line segment or a tangential inclination extending in the direction of resolution of the channel in question. In a manner known per se such information may be utilized in a subsequent data processing unit for classifying the line pattern.

As a result hereof a considerably coarser raster subdivision may be allowed relative to the scanning of a true representation of the line pattern, as in the cases of lens-mask or kinoform filtering, since by means of line segment filtering the information redundance which is always present in two-dimensional line patterns may be utilized to a considerable degree in a manner corresponding to the utilization of information redundance which is taking place in the human visual system in the regions of the cortex in which information from the retina is processed.

The invention is based on the recognition of the fact that by performing the filtering process in the separate channels by means of filters having one-dimensional redundance a considerable simplification and cost reduction is obtained relative to the above-mentioned kinoform filtering process simultaneously with a considerably improved optical efficiency over the lens-mask filtering process.

Herein, a filter having one-dimensional redundance is to be understood as a transformation means arranged in an optical system which in the plane of the transformation means can only be subdivided in one particular direction in partial elements having the same optical characteristics as the transformation means as a whole.

In contradistinction thereto the above-mentioned lens-mask filter assemblies constitute transformation means having no redundance at all, since a subdivision into partial elements having the same optical characteristics as the transformation means as a whole will not be possible in such filters without changing the mask whereby the imaging process proper will also be changed. This missing redundance puts severe demands to the precision of the optical system in each channel and moreover there will be a tendency for noise to a considerable degree to appear in the electronic response if only a few dust particles are present in the optical system. On the other hand the above-mentioned synthetic hologram filters constitute transformation means having two-dimensional redundance, since in this case the hologram plane as a whole may be arbitrarity subdivided into elementary areas each of which has the same characteristics in respect of resolution as the hologram as a whole, but a reduced efficiency, of course. Thus, two-dimensional redundance is also present in conventional, spherical lenses.

Considering the optical pulse response it will be seen that in filters having no redundance each point of said response will correspond to a particular point in the transformation means, for example one particular mask. In case of two dimensional redundance each point of the pulse response will be defined by the whole plane of the transformation means. In contradistinction to both these cases, each point of the pulse response from a filter having one-dimensional redundance will be defined by a straight line in the plane of the transformation means.

Practical experiments have shown that in the apparatus according to the invention extraction of line orientations and tangential inclinations is possible with a power of resolution of ± 10° to 20°. In practical applications of the invention in optical reading machines this power of resolution will be sufficient to secure a reliable function. However, a further improvement of the power of resolution may easily be obtained within the scope of the invention by increasing the number of channels and proportioning the optical systems in a suitable manner.

The invention also relates to an optical filter for use in each of a number of separated channels in an optical reading system for optical transformation of a two-dimensional line pattern, said filter having unidirectional power of resolution and one-dimensional redundance.

BRIEF DESCRIPTION OF THE DRAWINGS

In the following the invention will be explained in greater detail with reference to the schematical drawings, in which.

DETAILED DESCRIPTION

Figure 1:
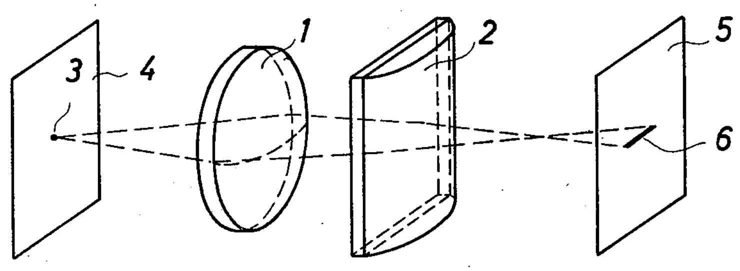
FIG. 1 illustrates the principal structure and operation of an optical filter employed in the apparatus according to the invention when filtering a point image.

As explained in the following the apparatus according to the invention comprises a number of separated channels in each of which an optical filter is incorporated having one-dimensional redundance and being of the type in which a point in an object plane is imaged in a rectilinear line segment in an image plane and vice versa. In FIG. 1 the principal structure and operation of such a filter is exemplified for the filtering of a point image. In the embodiment shown the optical filter is constituted by a combination of a convex sperical lens 1 and a cylindrical lens 2. By means of this optical filter a point 3 in an object plane 4 located outside the focal width of convex lens 1 will be imaged in an image plane 5 in a rectilinear line segment 6 having an orientation perpendicular to that of the generatrix of the curved surface of cylindrical lens 2. Inversely, a rectilinear line segment having this particular orientation in the image plane 5 will be imaged in a point in the object plane 4.

In case of a more complex input image in the object plane 4 in the form of a two-dimensional line pattern the filtering process performed by an optical filter as shown in FIG. 1 will result in a blurring of the image reproduced in the image plane 5 in the above-mentioned direction perpendicular to the direction of the generatrix for cylindrical lens 2. Thereby, rectilinear line segments in the input image which extend parallel to this direction will not be influenced to any noticeable degree, whereas line segments having a different orientation will be blurred in dependence on their deviation from this orientation.

Figure 2:
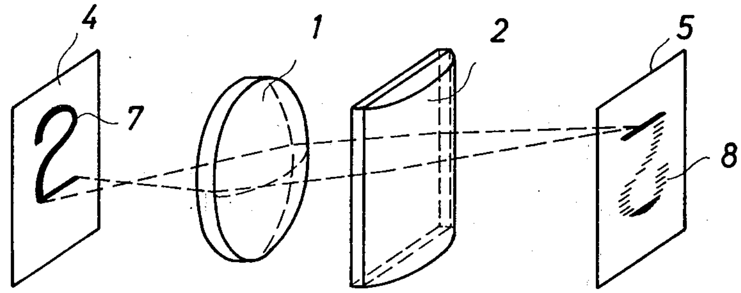
FIG. 2 illustrates the operation of the filter in FIG. 1 when filtering a two-dimensional line pattern in the form of a decimal digit.

This will appear more clearly from FIG. 2 which show the same optical filter when filtering a two-dimensional line pattern 7 in the object plane 4 in the form of the decimal digit two. As it appears from the figure the imaging process will result in this case in an extraction of the rectilinear line segments and tangential inclinations in line pattern 7 having an orientation perpendicular to the direction of the generatrix for cylindrical lens 2. As a matter of fact, only points forming parts of such line segments or corresponding to such tangential inclinations will be imaged at optimum intensity in the image plane 5, whereas all other points of the line pattern will be blurred in said direction and thus be imaged at a reduced intensity. Thus the result of an optical filtering process performed by the filter shown in FIGS. 1 and 2 will be a resolution of the input image along the direction perpendicular to that of the generatrix of cylindrical lens 2.

As it will appear from the following it will be possible by means of this unidirectional power of resolution when using any desired number of mutually different directions of resolution to perform an opto-electronic detection of the features of the input line pattern extracted for each of these directions of resolution by arranging photo-sensitive means in the image plane 5. By combining the individual informations about the line pattern obtained thereby in a suitable manner sufficient information about the whole line pattern for securing a reliable pattern recognition will be obtained.

To achieve this the input line pattern in the apparatus according to the invention is subjected to a filtering process of the kind described in a number of spaced channels incorporating optical filters having different directions of resolution, each of said filters having a structure as shown, for example, in FIGS. 1 and 2.

Figure 3A:
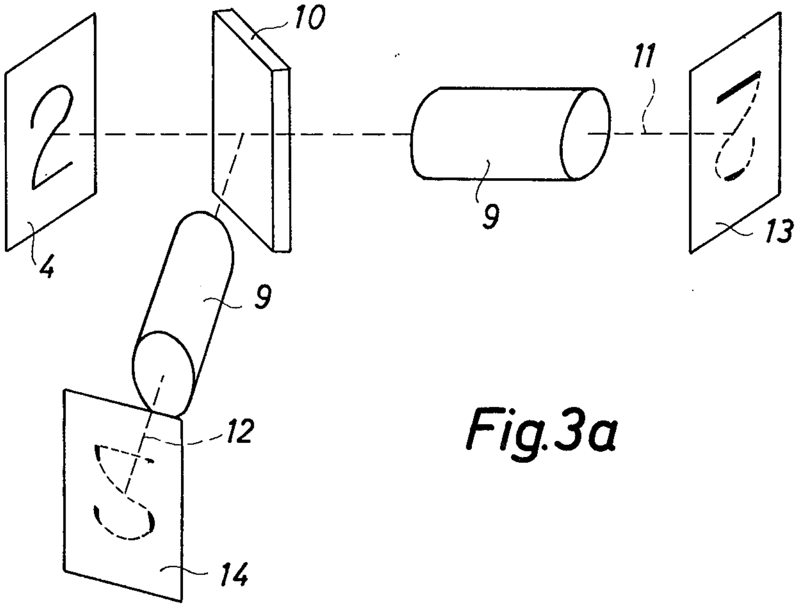
FIGS. 3a and 3b show two different methods for obtaining a number of separated channels in an embodiment of the apparatus according to the invention.

FIG. 3 shows at *a* and *b* schematical illustrations of two different methods for obtaining the necessary channel distribution. In this figure each optical filter is represented schematically by a device as symbolized at 9. In FIG. 3a the channel distribution is obtained by means of an optical beam-splitter 10 of a type known per se by means of which the imaging beams originating from the input line pattern in object plane 4 are split between two channels 11 and 12 extending in mutually perpendicular direction, each of which comprises an optical filter 9. Image planes for channels 11 and 12 are shown at 13 and 14, respectively.

Figure 3B:
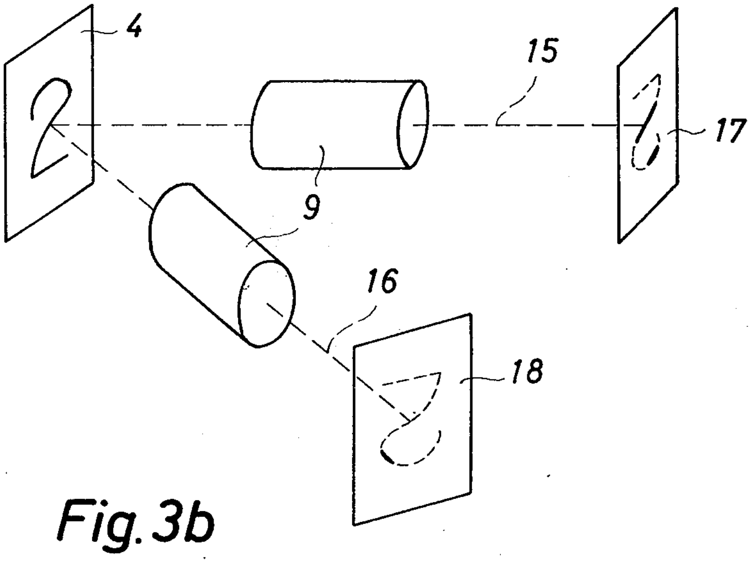

In FIG. 3b a channel distribution is illustrated in which the input line pattern in object plane 4 is imaged in directions forming an acute angle with each other by two optical filters 9 the optical axes of which are symmetrical relative to a normal of object plane 4. Thereby, two channels 15 and 16 are formed each of which comprises an optical filter 9 and an image plane 17 and 18, respectively.

It will readily be seen that an increased number of channels will be obtainable in both these channel distribution methods. Thus, in case of the distribution illustrated in FIG. 3a a further beam splitter may be incorporated in each beam emanating from beam-splitter 10 and so on, the total number of channels amounting thereby to a power of two. In case of the distribution illustrated in FIG. 3*b* more optical filters may be used, the optical axis for each pair of such filter being symmetrical relative to one and the same normal of object plane 4, the optical filters being positioned, for example, along a semi-circular arc concentric with a likewise semi-circular object plane.

Moreover, it will be possible to combine the two distribution methods by arranging, for example, a number of optical filters of a configuration as shown in FIG. 3*b* in each beam emanating from beam-splitter 10 in FIG. 3*a*.

Figure 4:
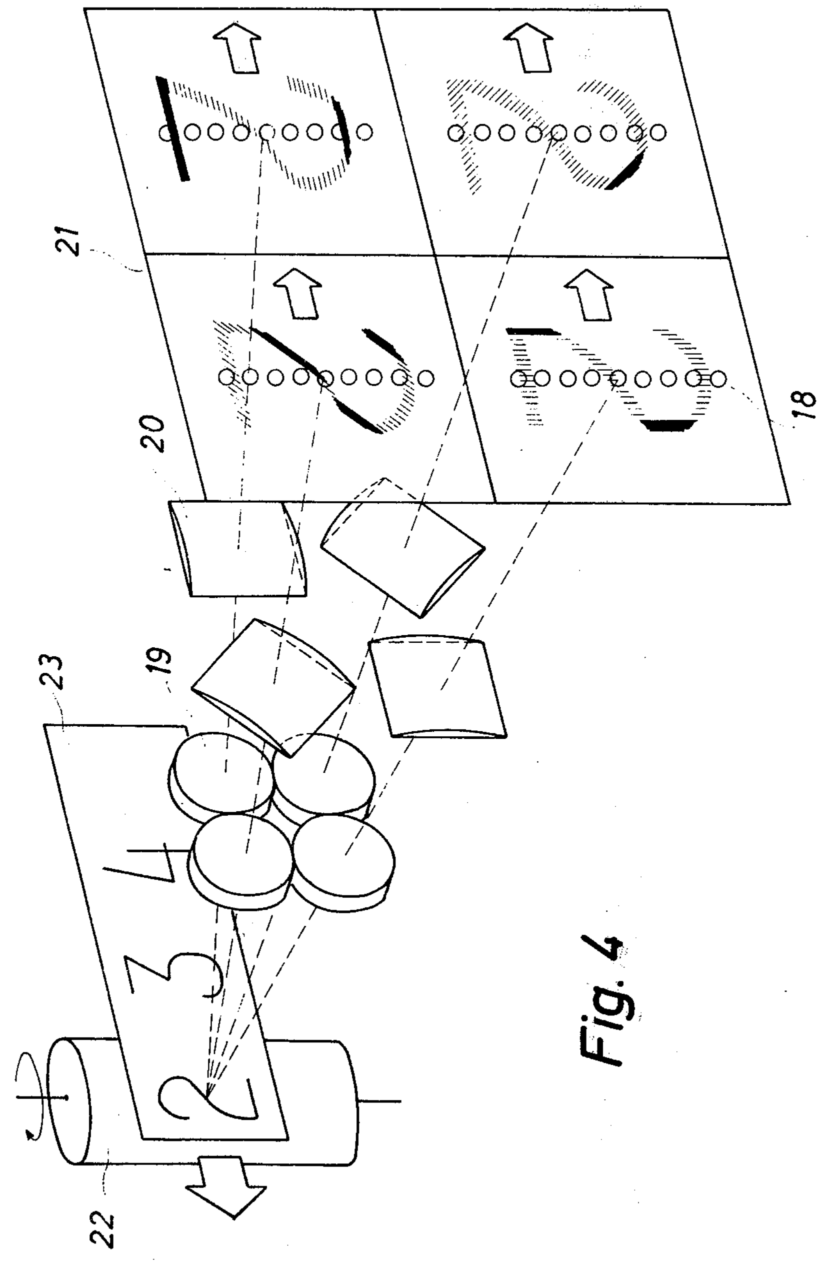
FIG. 4 illustrates the principal structure and operation of an embodiment of the apparatus according to the invention comprising four spatially separated channels.

In FIG. 4 an embodiment of the apparatus according to the invention is shown, comprising four spaced channels formed by the method illustrated in FIG. 3*b*, each of said channels including an optical filter of the structure illustrated in FIGS. 1 and 2, i.e. a combination of a convex spherical lens and a cylindrical lens as shown at 19 and 20, respectively, in FIG. 4. The four convex spherical lenses one of which is shown at 19 constitute together a so-called sector lens assembly the four individual lenses of which have the same power of magnification and are arranged with their optical axes extending in symmetry to a normal of the object plane. As shown in FIG. 4, the four cylindrical lenses have their generatrices orientated in mutually different directions, so that a resolution of the input line pattern in four different directions will be obtained, for example, in a vertical direction, a horizontal direction and two diagonal directions perpendicular to each other.

In the images planes of the channels which may as shown form one continous image plane 21 there will be imaged by means of the optical filters four representations of the input line pattern, in each of which line segments and tangential inclinations corresponding to the direction of resolution for the channel in question will be extracted.

According to the invention, detection of these extracted features of the input line pattern is performed by photo-sensitive means associated with image plane 21. Since it is apparent that such a detection in order to constitute a basis for a pattern recognition process must usually give information about the geographical positions of the features thus extracted from the line pattern, this detection will, in principle, always have to be based on a raster subdivision of the image plane in each channel into a number of elementary areas, in each of which the appearance of changes in light intensity exceeding a predetermined threshold value is detected.

It is well known that such a raster sub-division may be accomplished in different ways. Thus, if the input line pattern is stationarily positioned in the object plane, detection may take place by means of matrix arrangement of photo-sensitive devices such as photodiodes according to the desired raster sub-division in the image plane of each channel. In this case information about the light intensity distribution throughout the image, i.e. the light intensity levels in the individual elementary areas relative to those of the neighbour areas plane may be obtained by comparison of the electric outputs of said photo-sensitive devices which must, of course, be correctly adjusted relative to each other in advance.

Alternatively, the raster sub-division may be obtained by linear advancement of the input line pattern by means of a suitable advancing mechanism as shown schematically at 22 in FIG. 4 which applies a linear movement at a suitable speed to the line pattern which may in this case have the form a plan strip-shaped carrier bearing a sequence of decimal digits such as illustrated schematically in FIG. 4. The representation of the input line pattern formed in the image plane of each channel will thereby move in the opposite direction relative to the line pattern itself and it is readily seen that a considerable reduction of the number of photosensitive devices may be obtained thereby, since detection may then take place by means of a limited number of such devices positioned along a line perpendicular to the advancing direction with uniform spacings in accordance with the desired raster sub-division in this perpendicular direction. The raster sub-division in the advancing direction is obtained by the linear movement of the image representation of the input line pattern in combination with an electronic sampling of the photosensitive devices at a suitable sampling frequency.

Beyond the advantageous reduction of the number of photo-sensitive devices obtained by this detection method a direct applicability to the practical fields of utilization of the present invention is advantageously obtained, since in these fields optical reading should usually be performed of a great number of line patterns advanced successively through the apparatus, for example, letter items, checks and the like, so that such line patterns may be advanced continously without having to be stopped during the optical reading process.

A still further reduction of the number of photosensitive devices may be obtained by combining the linear advancement of the line pattern items illustrated schematically in FIG. 4 with a reciprocating optical scanning of the line pattern in a direction perpendicular to the direction of advancement which may be realized in a manner known per se by incorporating, for example, a mirror oscillating about an axis parallel to the direction of advancement between the object plane and the sector lens 19 in FIG. 4. In principle, a single photosensitive device will then be sufficient in the image plane in each channel, said device being sampled electronically with a suitable sampling frequency which will, of course, have to be considerably higher than in the above-mentioned case in which only linear advancement of the line pattern is used.

In the embodiment shown in FIG. 4 the number of directions of resolution is equal to the number of channels, since the generatrix orientation of each cylindrical lens 20 is different from the orientation of the generatrices of the three other cylindrical lenses, and in all the optical filters the convex spherical lenses 19 as well as the cylindrical lenses 20 have the same optical strength. By increasing the number of channels such as explained with reference to FIG. 3 a corresponding increase may be obtained in this manner of the number of directions of resolution. Practical experiences have shown that four directions of resolution will usually give sufficient information for reliable pattern recognition in case of line patterns in the form of printed or type-written alpha-numerical characters.

However, the present invention is not limited to equality between the number of directions of resolution and the number of channels. Thus, it will be possible to arrange the channels in two sets of channels in such a way that pairwise identity between a channel from one set and a channel from the other set is obtained as far as the direction of resolution is concerned by arranging the cylindrical lenses in the optical filters in such two channels with the same orientation of their generatrices, while in the optical filters in all channels in one channel set cylindrical lenses are used having an optical strength different from that of the cylindrical lenses in the optical filters in the channels of the other channel set. In each of the channel pairs the image formed in the channel in one set will then appear with a more pronounced blurring than the image in the other channel. Thereby it may be obtained that each channel in the channel set having the lower power of magnification any rectilinear line segment and any tangential inclination in the line pattern having an orientation corresponding to the direction of resolution for the channel in question will be extracted, whereas in the corresponding channel in the other channel set having the higher power of magnification only rectilinear line segments exceeding a certain minimum length will be extracted due to the more pronounced blurring of the line pattern. Thereby, information may be obtained for each direction of resolution whether response from a certain elementary area of the image plane is due to a rectilinear line segment exceeding said minimum length or a shorter line segment or a tangential inclination.

In the pattern recognition process performed on the basis of the optical correlation of the line pattern conducted in the apparatus according to the invention by filtering said pattern in a number of separated channels the signals from the photo-sensitive devices in the image planes of the individual channels are combined by a suitable electronic signal processing comprising a comparison step, a binarisation step and a sampling step in such a way that detection of the presence of line segments and tangential inclinations having the selected directions of resolution in the elementary areas or partial elements of the line pattern is obtained by the raster sub-division of the image planes.

Figure 5A:
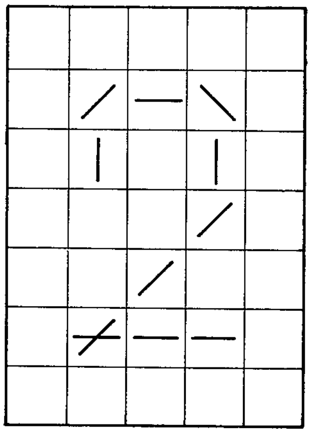
FIGS. 5a and 5b illustrate the resultant information about input line patterns obtained in the apparatus shown in FIG. 4 and in a known optical reading machine, respectively.

Such a data processing may be conducted in any manner known per se and is not an object of the present invention. However, the result of the detection thus obtained is schematically illustrated in FIG. 5*a*. It is readily seen that in the apparatus according to the invention information is obtained from each elementary area in the line pattern about any intersection of this elementary area by a line segment and about which of the four directions of resolution in closest to such a line segment.

Figure 5B:
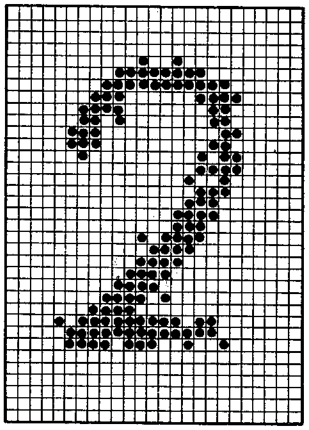

For comparison purposes FIG. 5*b* illustrates the recording of the same input line pattern obtainable in a prior art optical reading machine in which it is detected for each elementary area in the object plane whether this area contains a part of the line pattern or not. It appears clearly that a raster sub-division of a considerably higher fineness will be necessary in this case, as a result of which the subsequent data processing step will be much more complicated.

Thus, an essential advantage of the apparatus according to the invention is due to the particular information obtained by the optical filtering process about the directions of line segments and tangential inclination in the input line pattern, whereby a considerably coarser raster sub-division may be used than in known optical reading machines and the computer necessary for the further signal processing may be less complicated and cheaper.

What is claimed is:

1. An apparatus for use in an optical pattern recognition system for the optical input transformation of a two-dimensional line pattern in a number of separated channels into opto-electronically detectable images, the images in each of said channels being correlated with said pattern and extracting a particular line orientation therein, said channel images forming together the optical input information for a subsequent classification of said pattern into one of a given number of pattern classes, said apparatus comprising a common object plane for all said channels; means at said object plane for positioning said line pattern; optical transformation means in each of said channels constituted by optical filters having unidirectional power of resolution and one-dimensional redundance, said optical filters being arranged in different ones of said channels with mutually differing directions of resolution; an image plane in each of said channels; means for subdividing the image of said pattern formed in each of said image planes in two mutually orthogonal directions into a raster of elementary areas each comprising a portion only of the entire pattern image; and photo-sensitive means arranged at each of said image planes for selectively detecting the optical input information from each elementary area simultaneously in all said channels, said input information being constituted by the luminous intensity received by said photo sensitive means, said photo sensitive means being adjusted to supply an electric output signal in response to the magnitude of said luminous intensity relative to a threshold.

2. An apparatus as claimed in claim 1, wherein each of said optical filters comprises the combination of a convex spherical lens and a cylindrical lens.

3. An apparatus as claimed in claim 2, wherein the convex spherical lenses of the optical filter incorporated in at least two of said channels are formed by a sector lens having a number of spatial separated lenses corresponding to the number of channels.

4. An apparatus as claimed in claim 2, wherein the cylindrical lenses of the optical filters for all of said channels have equal powers of magnification, the cylindrical lens in each channel having a generatrix orientation different from that of the cylindrical lens in any other channel.

5. An apparatus as claimed in claim 2, wherein said channels are arranged in channel pairs each comprising two channels, the cylindrical lenses in said two channels of the same channel pair having mutually different powers of magnification and the same generatrix orientation, said generatrix orientation differing from that of the cylindrical lenses in any other channel pair.

* * * * *